United States Patent [19]

Le Gars et al.

[11] 4,455,653

[45] Jun. 19, 1984

[54] APPARATUS COMPRISING A DIGITAL PROCESSOR AND FUNCTION TEST MEANS

[75] Inventors: Jacques Le Gars, Pacy/Eure; Martine Losset; Michel Remery, both of Evreux, all of France

[73] Assignee: U.S. Philips Corporation, New York, N.Y.

[21] Appl. No.: 104,208

[22] Filed: Dec. 17, 1979

[30] Foreign Application Priority Data

Dec. 18, 1978 [FR] France .................. 78 35599

[51] Int. Cl.³ ............................................ G06F 11/32
[52] U.S. Cl. ..................................... 371/20; 364/400; 371/29
[58] Field of Search ................... 371/20, 29; 364/400

[56] References Cited

U.S. PATENT DOCUMENTS 4,034,194  7/1977  Thomas et al. .................. 371/29 X
4,058,316 11/1977  Miller ............................. 371/20 X
4,158,431  6/1979  Van Bavel et al. ............... 371/20
4,200,224  4/1980  Flint ............................. 371/20 X Primary Examiner—Jerry Smith
Attorney, Agent, or Firm—Robert T. Mayer; Bernard Franzblau

[57] ABSTRACT

An appliance comprising a programmed digital processor having an integral test procedure and input and output terminals for connection to further parts of the apparatus, including input means and display means. In order to test the input and output terminals of the signal processor and the connections to further parts of the apparatus, further connections are provided from input and/or output terminals of the signal processor, via a plurality of gates which are activated by the signal processor via a further terminal thereof, to other input and/or output terminals of the signal processor. When the test procedure is activated, an indicator indicates whether or not the tested terminal and/or connection is in good order.

8 Claims, 10 Drawing Figures

APPARATUS COMPRISING A DIGITAL PROCESSOR AND FUNCTION TEST MEANS

The invention relates to an apparatus comprising a programmed digital signal processor with test procedure means and with input and output terminals for connection to further parts of the apparatus, including input means and display means. The invention also relates to a method of testing said apparatus. The increasing use of programmed digital signal processors implies an increasing demand for testing of said signal processor in the apparatus in which it is incorporated. In this respect it is important that the test can be simply performed and that no additional aids have to be connected to the apparatus in the field for this purpose. The foregoing is particularly applicable to the field of domestic appliances. Appliances such as washers/dishwashers, ovens etc. increasingly utilize said signal processors (microprocessors) and testing in the field should be simple.

In the case of a breakdown, these machines are almost always repaired on site, and the detection of faults in electronic circuits generally requires personnel who are more skilled than the personnel who generally repair conventional electromechanical machines.

The customary arrangement of the electronic circuit on a plug-type printed circuit board only partly solves this problem because the repair of faults requires a systematic exchange of all boards, without the technician having the certainty that the defect indeed stems from the electronic circuits.

Such apparatus comprising a test facility are known per se U.S. Pat. No. 4,158,431. A problem often encountered in this respect consists in that during the test procedure additional steps must be taken to ensure that the number of input terminals and output terminals of the signal processor suffices. This is because each signal processor (nowadays constructed in solid-state integrated techniques) comprises only a limited number of terminals. In order to enable the desired tests to be performed, longer test procedure routines are required which require more storage capacity. The required larger memories involve additional costs and in given cases it may even be necessary to abstain from the intended use of a programmed digital signal processor with the memory incorporated exclusively therein.

In order to mitigate the described problem, the apparatus in accordance with the invention is characterized in that for the testing of input and output terminals of the signal processor and the connections in further parts of the apparatus, there are provided further connections from input and/or output terminals of the signal processor, via gating means which are enabled by the signal processor via a further terminal thereof, to other input and/or output terminals of the signal processor. A relevant indicator then indicates whether or not the tested terminal and/or connection is in good order when the test procedure means are activated.

As a result of the presence of said gating means, which are to be enabled by the signal processor itself, it is possible to satisfy the described requirements at low cost.

The invention relates in particular to an appliance comprising;
first input means for inputting parameters for controlling the appliance,
second input means for inputting quantities concerning characteristics of goods and/or objects to be treated in the appliance (fried or washed, etc.),
display means,
a programmed digital signal processor with test procedure means, input terminals for receiving said parameters, output terminals for supplying data to the display means, and
terminals for supplying said parameters to treatment members of the apparatus to be controlled.

This arrangement notably concerns automatic washing machines and dish washers with a built-in electronic display.

An "electronic display" is to be understood to mean herein an assembly of means which makes it superfluous for the user of the appliance to consult the written instructions for use in which the manufacturer recommends a large number of suitable selections for controlling the appliance as a function of the nature and the state of the objects to be washed.

To this end, the user has available control members which, for example, in the case of a washing machine, make it possible to display the nature of the fabric and the degree of soiling. This information is introduced into a microprocessor and is processed to control the illumination of signal lamps or numerical displays from which the user can read the nature and number of detergents to be introduced into the machine, the temperature to be displayed on the thermostat, the choice of the speed (or possibly the absence) of spin drying, the starting position of the programmer, etc.

Such a washing machine comprising an electronic display is described in U.S. patent application Ser. No. 961,426, filed on Nov. 16, 1978 and now abandoned.

Even though the electronic display represents an improvement as far as the effective use and ease of operation of washing machines are concerned, the introduction of comparatively complex logic and analog circuits in electrical domestic appliances gives rise to increased after-sales maintenance costs.

This increase of the after-sales service costs, initially born by the manufacturer during the guarantee period and subsequently by the user, is liable to have an adverse effect on the commercial prospects of washing machines comprising an electronic display.

An object of the invention is to enable the normal service personnel to perform reliable detection of a malfunction in any of the boards which together accommodate inter alia the circuits of the electronic display so that they can perform the normal exchange of this display.

In order to achieve this object and to comply with the foregoing statement concerning the number of available terminals of the signal processor, the appliance in accordance with the invention is characterized in that for the testing of input and output terminals of the signal processor and the connections between these terminals and the input devices and display means there are provided further connections from input terminals and output terminals of the signal processor, via gating means enabled by the signal processor via a further terminal thereof, to other input terminals and output terminals of the signal processor. A relevant indicator then indicates whether or not the terminal and/or connection tested is in good order when the test procedure means are activated.

A further embodiment of the appliance in accordance with the invention is characterized in that a first family of terminals of the signal processor comprises the terminals of a first group of input/output terminals which can be fed back as a function of the state of the test terminal, via logic gates, to the terminals of a second group of input/output terminals, while a second family of terminals comprises the terminals of a third group of output terminals which can be fed back as a function of the state of the test terminal, via logic gates, to the terminals of the first group.

The method of performing a test in an appliance of the type described above is characterized in that test sequences are introduced by means of a pushbutton which changes the state of the test terminal of the signal processor.

The sequential test procedure in accordance with the invention is very simply controlled by the pushbutton, which merely has to be operated a number of times by the repair technician in order to test the assembly of circuits of the display. The fault is indicated by means of a signal lamp and the normal display means of the display.

Without any particular electronic know-how, the repair technician himself can thus quickly localize the defective board for replacement.

The invention will be described in detail hereinafter with reference to the accompanying diagrammatic drawings.

For the sake of simplicity, the diagram of FIG. 1 only shows the elements concerning the electronic display, with the exclusion of other known elements of automatic washing machines.

Figure 1:
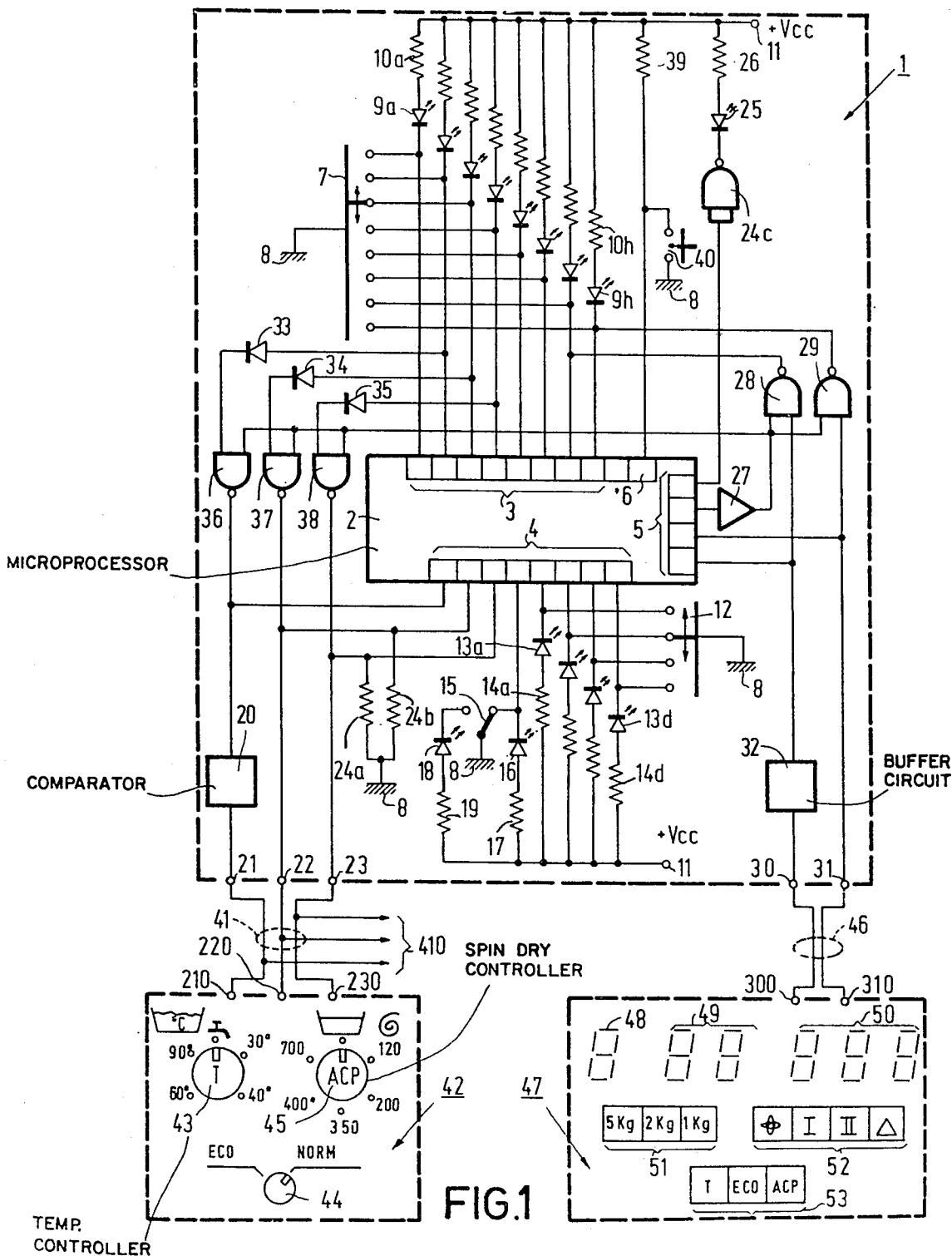

FIG. 1 shows a printed circuit board 1 which accommodates a signal processor 2, more particularly a microprocessor, which is marketed by "SIGNETICS", type 8021, and which comprises a first family of terminals comprising the terminals of two input/output groups 3 and 4. A second family of terminals comprises an output group 5 of four terminals, the terminals of the group 3 (also a part of the first family), and an input test terminal 6.

To the inputs/outputs of the group 3 there are connected on the one hand eight contacts of a switch 7 for indicating the nature of the laundry to be washed, the common contact of which is connected to a common ground 8, and on the other hand the cathodes of eight electroluminescent diodes (LED) 9a to 9h, the anodes of which are connected, via eight resistors 10a to 10h, to the positive terminal 11 of a direct voltage source VCC.

To four of the inputs/outputs of the group 4 there are connected on the one hand the four contacts of a switch 12 for indicating the degree of soiling of the laundry, the common contact thereof being connected to ground 8, and on the other hand the cathodes of the four electroluminescent diodes 13a to 13d whose anodes are connected, via four resistors 14a to 14d, to the terminal 11 of the voltage source VCC.

A further input/output of the group 4 is connected on the one hand to one of the contacts of a unipolar reversing switch 15 for "full load/half load", the common contact of which is connected to ground 8, and on the other hand to the cathode of an electroluminescent diode 16, the anode of which is connected, via a resistor 17, to the terminal 11 (VCC). The other contact of the reversing switch 15 is also connected to the terminal 11 via a further electroluminescent diode 18 and a resistor 19.

A further input/output of the group 4 is coupled, via a comparator circuit 20, to a temperature data input terminal 21. The last two inputs/outputs are connected to an input terminal 22 for normal program or economy program, and to an input terminal 23 for the dry spinning speed, respectively. Two resistors 24a and 24b are connected between the two terminals 22, 23 and ground 8.

One of the outputs of the group 5 is coupled, via an electronic reversing switch 24c, to the cathode of an electroluminescent diode 25, the anode of which is connected to the terminal 11 (+VCC) via a resistor 26.

A further output "validation" of the group 5 is coupled, via an amplifier 27, to the two first combined inputs of two "NAND"-gates 28 and 29, the outputs of which are connected to two inputs/outputs of the group 3.

The last two outputs, "clock" and "data", of the group 5 are connected on the one hand to the second inputs of the NAND-gates 28 and 29 and on the other hand to the two output terminals "clock" and "data", 30 and 31, of the printed circuit board 1, the former being connected via a buffer circuit 32 and the latter being directly connected.

Three inputs/outputs of the group 3 are connected to the anodes of three current limiting diodes 33, 34 and 35, the cathodes of said diodes being connected to the first inputs of three NAND-gates 36, 37 and 38. The outputs of these NAND gates are connected to three inputs/outputs of the group 4. The second interconnected inputs of the three NAND-gates and connected to the output of the amplifier 27, so to the VALIDATION output terminal of group 5.

The test input 6 of the microprocessor 2 is connected on the one hand to the terminal 11 (+VCC) via a resistor 39, and on the other hand to one of the contacts of a push button interrupter 40, the other contact of which is connected to ground 8.

The terminals 21, 22 and 23 of the board 1 are connected, via a cable 41, to the terminals 210, 220 and 230 of a second board 42 which supports a controller 43 for the temperature (T) of the washing water, a switch 44 for normal program (NORM) and economy program (ECO), and a controller 45 for the dry spinning speed (or stopping with full tub). These two are indicated by (ACP). The output terminals 210, 220 and 230 of the board 42 are connected, again via a cable bundle 410, to the electromechanical elements of the washing machine (not shown).

The terminals 30 and 31 of the board 1 are connected via a cable 46, to the terminals 300 and 310 of a third board 47 which accommodates a display indicates 48 which comprises seven segments for indicating the recommended washing program, a group of two indicators 49 for the recommended temperature of the washing water, and a group of three indicators 50 for the recommended dry-spinning speed.

The board 47, moreover, accommodates a group 51 of three signal lamps for indicating the recommended load of the machine, a group 52 of four signal lamps for indicating the recommended amount of detergent, and a group 53 of three alarm lamps concerning the temperature, the economy program and the stopping with full tub.

Disregarding for the moment the test in accordance with the invention, the electronic display of the drawing operates as follows:

The user indicates, by means of the switches 7, 12 and 15, the parameters concerning the nature of the laundry to be washed, the degree of soiling, and the quantity. In accordance with the position of these switches, one of the inputs/outputs of the group 3 and one or two inputs/outputs of the group 4 of the microprocessor 2 are connected to ground, thus introducing the corresponding data into the microprocessor and causing illumination of the relevant electroluminescent display diodes.

The data corresponding to the said parameters are processed by the microprocessor 2 which supplies, on the output terminals 30 and 31 of the board 1, the sequential signals which serve, after storage and processing, to activate on the card 47 the elements for optimum control of the machine as determined by the internal program of the microprocessor as a function of the parameters introduced, that is to say on the indicator 48 the starting number of the electromechanical programmer, on the indicator 49 the control position of the thermostat, on the indicator 50 the dry-spinning speed, on the indicator 51 the weight of the laundry to be loaded into the machine, and on the indicator 52 the detergent or detergents to be introduced into the receptacles.

On the basis of the indications given on indicators 48, 49 and 50, the user sets the programmer (not shown) to the position indicated on 48, subsequently sets the thermostat 43 of the board 42 to the number indicated on 49, and finally sets the dry-spinning speed controller 45 to the number indicated on 50.

Should the user ignore some of the controls indicated on the board 47, in some cases the laundry may be adversely affected, for example, an excessive washing water temperature for synthetic fabrics, an insufficient amount of water during the economy program, dry-spinning for wool, etc.

The alarm signal lamps 53 warn the user of these dangers. To this end, the data supplied by the board 42 and normally transported by the cable bundle 410 to the electromechanical elements of the machine are also input on the board 1 via the terminals 21, 22 and 23 so that they are utilized on three inputs/outputs of the group 4 of the microprocessor 2. If the non-correspondence of the position of one or more control members of the board 42 with respect to the recommended controls indicated on the card 47 is liable to have adverse effects on the laundry to be washed, the microprocessor 2 supplies on the terminals 30 and 31 of the card 1 a signal sequence which is processed on the board 47 and which causes illumination of the alarm lamp (lamps) 53 concerned. The user can then change the controls of the card 42 so that said lamps extinguish.

The sequential test procedure of the electronic display is briefly summarized in the following table. The programs which test these sequences and which are stored in the memories (ROM) of the microprocessor and also the subroutines have been developed in detail.

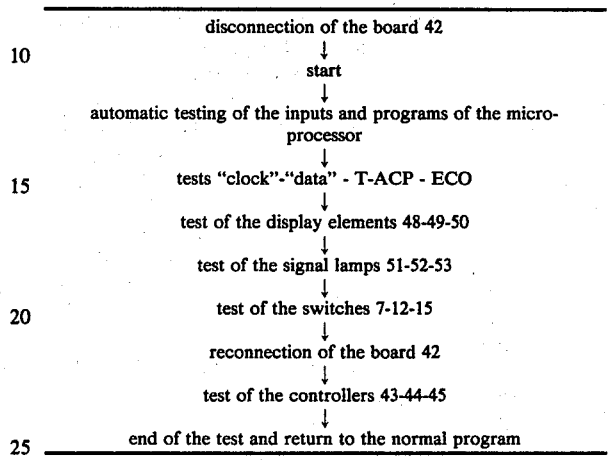

The cable bundle 41 is disconnected from the board 1, the switches 7 and 12 are set to the upper position, the reversing switch 15 is set to its left position and the pushbutton 40 is depressed. The test input 6 of the microprocessor is thus connected to ground and the test sequence is activated when the push button 40 is released, that is to say when the state "0" of the input 6 becomes "1".

The first sequence, having a duration of a fraction of a second, is an automatic test of the inputs and the internal programs of the microprocessor and its completion is indicated by the electroluminescent diode 25, which flashes when the test result is positive and which otherwise remains extinguished.

When the button 40 is subsequently depressed, a validation signal "1" is applied to the amplifier 27 which sets the outputs of the NAND-gates 28, 29, 36, 37 and 38 to "0" when a "1" level is applied to their second input. This enables verification of the outputs and inputs "clocks" and "data" of the microprocessor via the gates 28 and 29, while the gates 36, 37 and 38 perform a "simulation" of the activation of the inputs 21, 22 and 23 of the board 1, corresponding to the data concerning temperature, economy program and "stop with full tub" of the spin-drying controller 45. Correct completion of the test is again indicated by the flashing of the diode 25.

During the subsequent sequence, all indicators of the board 47 extinghuish. By depressing the button 40 ten times, the digits 0 to 9 are displayed on the display 48, the tens on the display 49, the hundreds on the display 50. The testing of the digit of the units of the temperature 49 display and the testing of the digits of the units and tens of the spin-drying speed display 50 is useless, because the recommended values supplied by the program of the electronic display are given in tens of degrees and in hundreds of revolutions per minute.

During the next sequence, the displays 48, 49 and 50 extinguish and the ten signal lamps 51, 52 and 53 light up. By depressing the push button 40 ten times, successively one of the nine lit signal lamps is extinguished, and by subsequently depressing it a further ten times the nine extinguished signal lamps are successively lit one after the other.

During the next sequence, the lamps 51, 52 and 53 are extinguished and operation of the switch 7 successively causes the appearance of the digits 1 to 8 on the display 48. Similarly, operation of the switch 12 causes the appearance of the digits 1 to 4 in the tens place of the display 49. While the hundreds place of the display 50 represents the two positions of the reversing switch 15.

The board 42 is subsequently connected again to the board 1, after which the temperature controller 43 and the spin-drying controller 45 are set to the left position, while the controller 44 is set to "normal". After depression of the button 40, the controller 43 is set to the right and causes the lighting up of the lamp "temperature" of the group 53, while the setting to the right of the controller 45 causes lighting up of the lamp "stop with full tub". Similarly, the changing of the controller 44 to the position "economy" causes illumination of the corresponding lamp of the group 53.

The correct execution of each sequence is indicated by the lighting of the diode 25. It will be obvious that the test sequences which activate the displays and lamps of the board 47 make this verification superfluous because any defect is directly visible on said board.

A final depression of the button 40 terminates the test procedure, the diode 25 extinguishes and the microprocessor is again activated to execute its normal program. The test procedure "maintenance" just described is executed by a service technician at the location of use. In a manner not shown, an abbreviated test procedure which is referred to as "workshop test" can be performed where only the verification sequences on the board 1 are carried out.

Obviously, the invention also relates to the case where the data output members of the board 47 are interface circuits which serve to control the active elements of the washing machine as a function of the data supplied by the microprocessor of the electronic display instead of control by the data input via the board 42.

Figure 2:
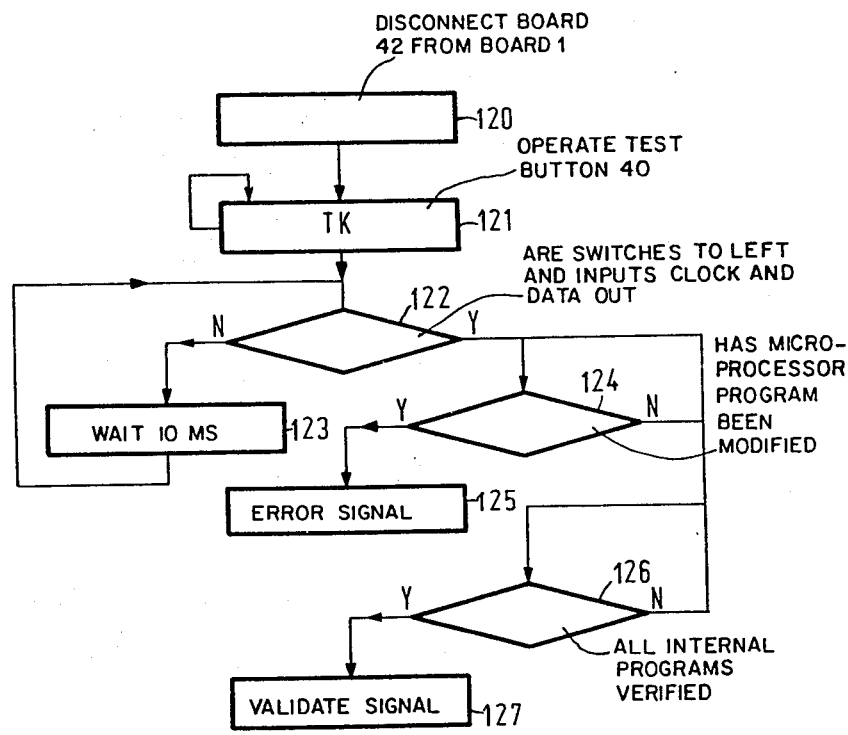
FIG. 2 shows a flow diagram of the verification of the programs.

The flow diagram of FIG. 2 relates to the first three sequences of the foregoing table. The cable bundle 41 is disconnected from the board 1 (block 120) and the button 40 (denoted as TK) is operated (block 121). If the switches 7, 12 and 15 are not in the correct position (tested in block 122), the test is repeated ten times per second (block 123). In the opposite case, the state of the first one of the internal programs of the microprocessor is verified (block 124). If there has been a modification, the sequence is interrupted and the diode 25 remains extinguished (block 125). In the opposite case, all programs of the microprocessor are successively fetched (tested in block 126) and if they are correct, the diode 25 starts to flash to indicate the end of the cycle and the correct execution of the test (block 127). Failure of the diode 25 to flash means that there are one or more faults (output N of block 126).

Figure 3:
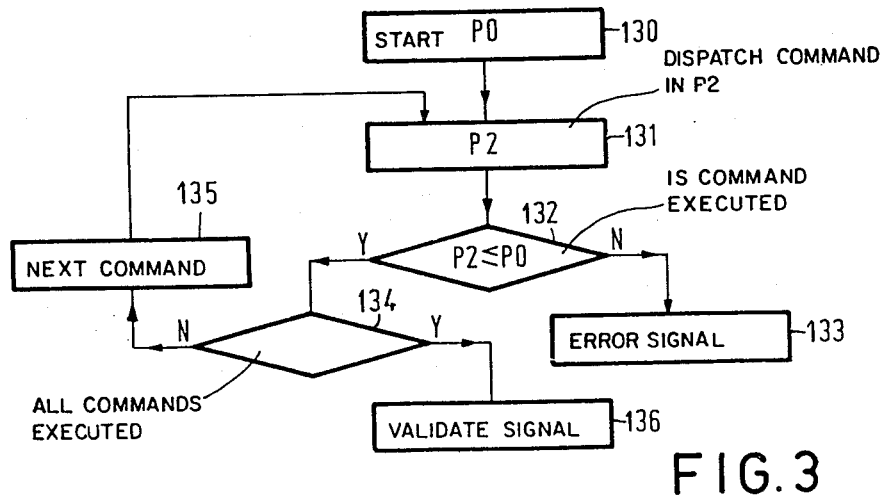
FIG. 3 shows a flow diagram of the verification of data-clock.

The flow diagram of FIG. 3 relates to the first part "testing clock—data" of the fourth sequence of the foregoing table.

When the button 40 is operated, the inputs/outputs of the group 3 are set to a starting state "1" (block 130) which triggers a despatch order from a test configuration on the inputs/outputs of the group 5 (block 131). If this order is not executed (tested in block 132), the test is interrupted and the diode 25 remains extinguished (block 133). In the opposite case, a loop (blocks 134, 135, 131, 132) successively addresses a sequence of test configurations until the diode 25 lights up (block 136) to indicate that they have all been executed (tested in block 134).

Figure 4:
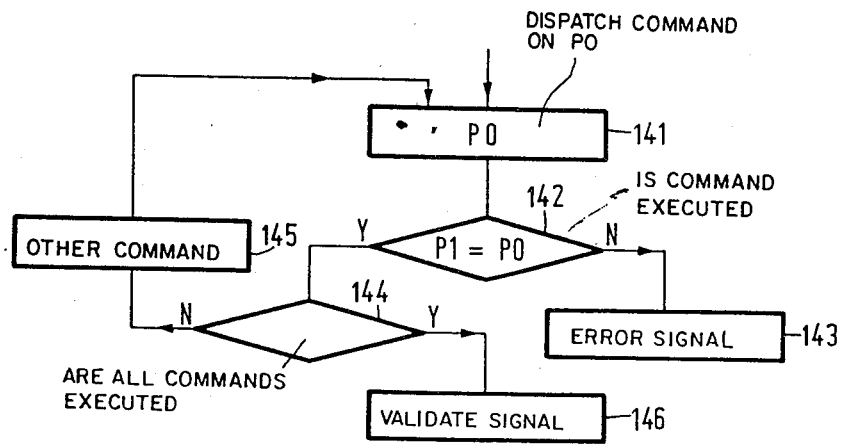
FIG. 4 shows a flow diagram of the verification of T, ECP, ECO.

The flow diagram of FIG. 4 relates to the part "testing the temperature" (T), "stopping with full tub" (ACP), "economy" (ECO) of the fourth sequence of the foregoing table.

This sequence resembles that of FIG. 3 in all respects, with the exception of the fact that the despatch instructions from the test configurations are realized on the inputs/outputs of the group 3 (block 141, comparable to block 131 of FIG. 3).

Figure 5:
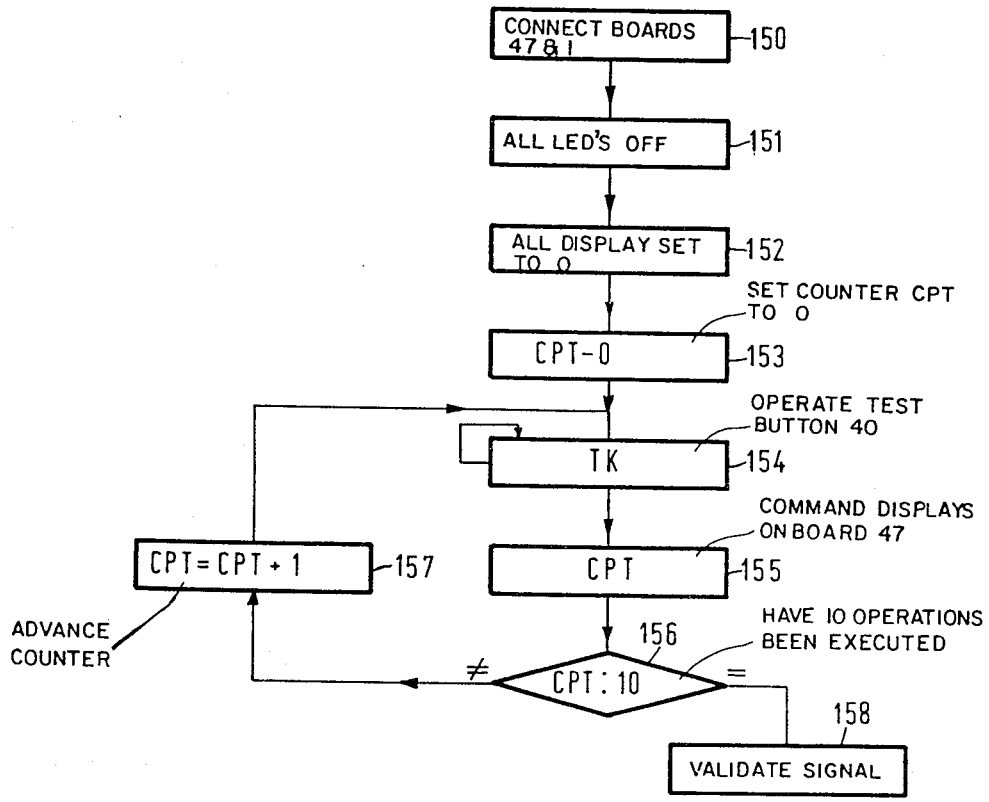
FIG. 5 shows a flow diagram of the testing of the display means 48, 49, 50.

The flow diagram of FIG. 5 relates to the fifth sequence of the foregoing table.

The boards 47 and 1 are first connected (block 150). Operation of the button 40 successively causes, on the inputs/outputs of the groups 3 and 4, the despatch of an extinguishing instruction for the electroluminescent diodes (block 151), and subsequently on the group 5 a command for setting the displays 48, 49, 50 to "0" (block 152), and finally a command for setting an internal counter CPT of the microprocessor to "0" (block 153).

As from this instant, each operation of the button 40 (block 154) causes the displays 48, 49 and 50 to pass successively from "0" through "9". This data is supplied by an internal read-only memory of the microcomputer, indicated by the counter CPT (block 155). A loop advances the internal counter by one step in reaction to each operation of the button 40 (blocks 154, 155, 156, 157) and when the ten operations have been executed (detected in block 156), the diode 25 lights up (block 158).

Figure 6:
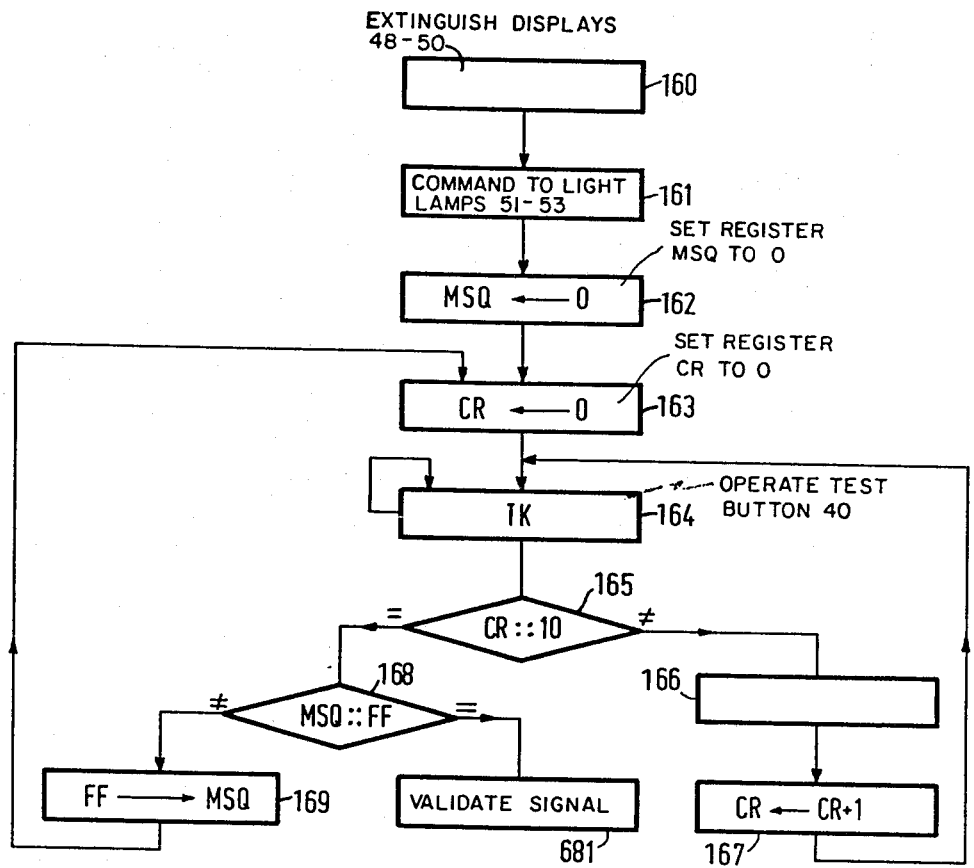
FIG. 6 shows a flow chart of the testing of the display means 51, 52, 53.

The flow diagram of FIG. 6 relates to the sixth sequence of the foregoing table.

Operation of the button 40 successively causes on the inputs/outputs of the group 5 the despatch of an extinguishing command for the displays 48, 49, and 50 (block 160), and a command for the lighting up of the lamps 51, 52 and 53 (block 161), followed by the despatch of an instruction for the setting to "0" (blocks 162, 163) of a first internal register (mask, indicated as MSQ) and a second internal register (counter, indicated as CR).

As from this instant, each operation of the button 40 (block 164) causes the extinguishing of one of the nine lit lamps, followed by the lighting up one by one of the nine extinguished lamps. These two series of sequences (the blocks 164, 165, 166, 167) are executed by means of an internal read-only memory of the microprocessor (block 166) which is addressed by the counter (block 165) and an EXCLUSIVE-OR gate, the former for the mask at "0" and the latter after the resetting to "0" (via the block 169) of the counter for the mask at "1" (FF) (block 168). After the series, a validation signal appears on the electroluminescent diode 25 (block 681).

Figure 7A:
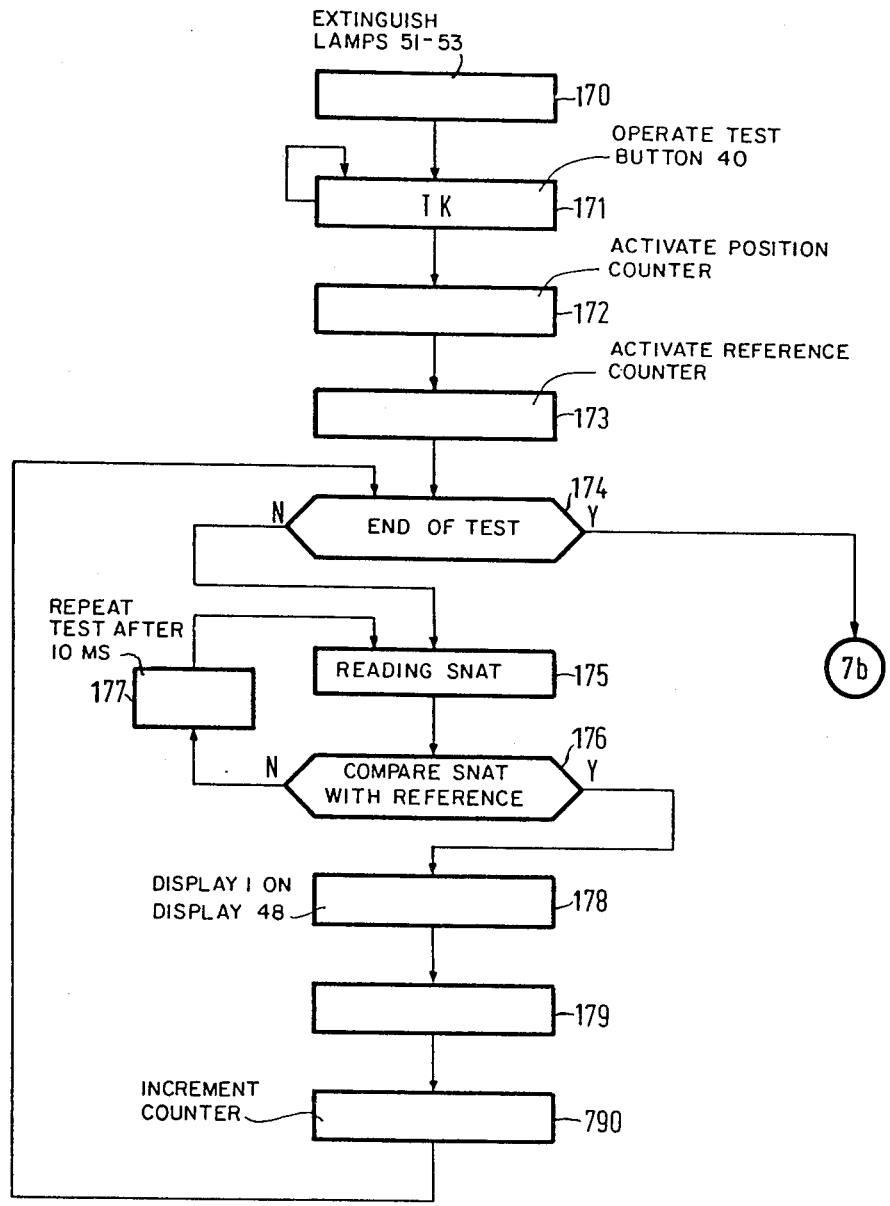
FIG. 7a shows a flow diagram of the testing of the switch 7.

The flow diagram of FIG. 7a relates to the first part of the seventh sequence of the foregoing table, representing the testing of the switch 7.

After the extinguishing of the lamps 51, 52 and 53 (block 170), the button 40 is pressed (block 171) to activate a counter for the number of positions to be verified (block 172) and also a reference word (block 173). A first operation of the switch 7 for the nature of the laundry (selection of nature: SNAT) causes the appearance, on the group of inputs/outputs 5 of a read signal (block 175) which is compared with the reference word (block 176). If the result is negative (N), the test is repeated every ten milliseconds (via block 177). In the opposite case (Y), the digit 1 is displayed on the display 48 (block 178). A second operation of the switch 7 produces the digit 2, and so on (via block 790 for incrementing the counter). When the digit 8 is reached, it is compared with the content 8 ("max. value") of the position counter (in block 174) which terminates the first part of the test and switches over to the second part ("Y").

Figure 7B:
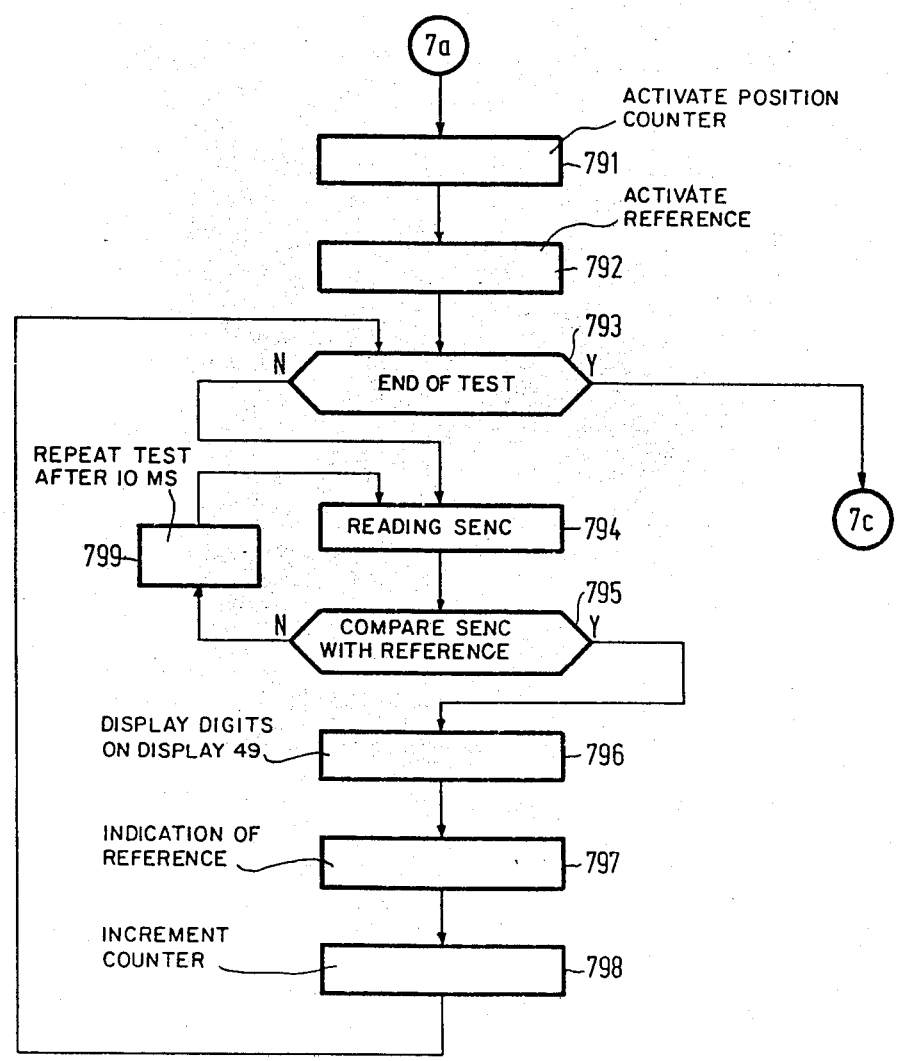
FIG. 7b shows a flow diagram of the testing of the switch 12.

The flow diagram of FIG. 7b relates to the second part of the seventh sequence of the foregoing table.

The end of the test of FIG. 7a activates the position counter (block 791), the remainder of the procedure being exactly identical to FIG. 7a, except that it concerns the 4-position soiling switch 12 (SENC) whose display control element causes the appearance of the digits 1 to 4 on the tens place of the display 49 (the blocks 792-799).

Figure 7C:
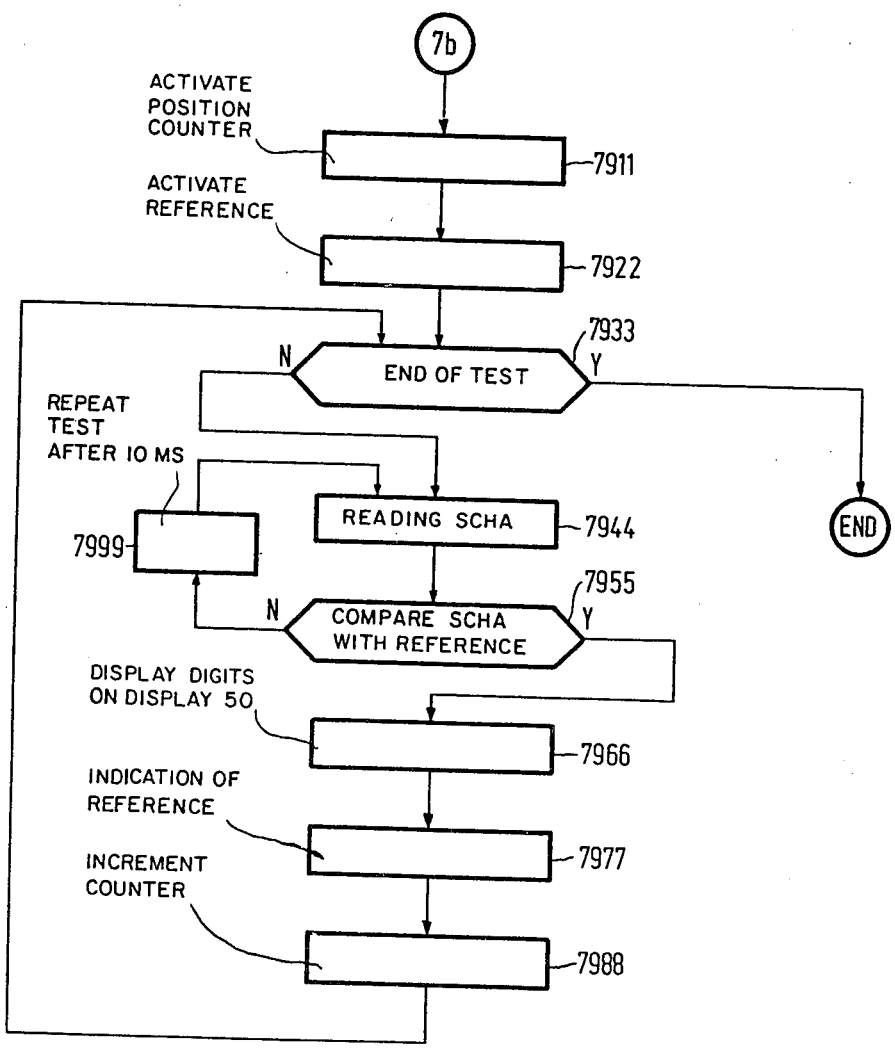
FIG. 7c shows a flow diagram of the testing of the switch 15.

The flow diagram of FIG. 7c relates to the third and last part of the seventh sequence of the foregoing table.

The end of test signal of FIG. 7b activates the position counter (block 7911), the two positions of the switch 15 for full-load/half-load being displayed on the hundreds place of the display 50 (the blocks 7922-7999).

Figure 8:
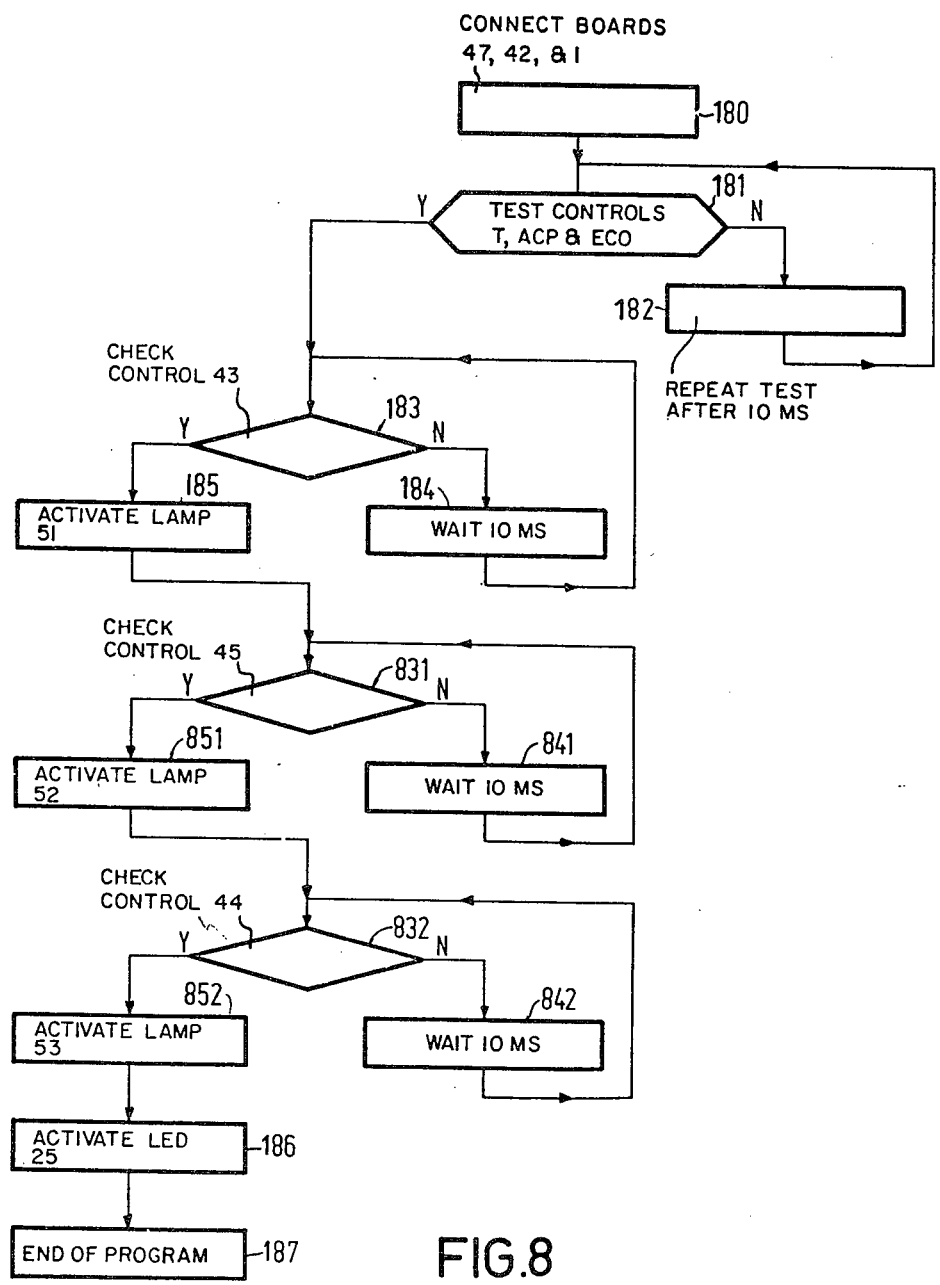
FIG. 8 shows a flow diagram of the testing of T-ACP-ECO.

The flow diagram of FIG. 8 concerns the eighth, the ninth and the tenth sequences of the foregoing table.

After reconnection of all boards (block 180), a first test is performed to check whether or not the manual controls T, ACP and ECO have been set to the prescribed positions (block 181). If not, the test is repeated every ten milliseconds (block 182). If yes, three tests are peformed in cascade to check the execution of the operations of the controls 43, 44 and 45, each correct operation causing lighting up of a respective one of the lamps T, ECO or ACP of 53. These three tests are represented by the blocks 183, 185; 831, 851; 832, 852. If one of these tests is not passed, it is repeated at intervals of ten milliseconds (via the blocks 184, 841 and 842, respectively).

Proper execution of the third test produces a lighting signal for the diode 25 (block 186) which represents the end of the program of test sequences (block 187).

Texts in the blocks of the FIGS.

|  | block number | description of the function |
|---|---|---|
| FIG. 2 | 120 | disconnection of board 42 from board 1 |
|  | 121 | test button TK |
|  | 122 | switches to the left and inputs "clock" and "data" extinguished |
|  | 123 | waiting period of 10 ms |
|  | 124 | internal program of microprocessor: has it been modified? |
|  | 125 | error signal electroluminescent diode (LED) 25 extinguishes |
|  | 126 | have all internal programs been verified? |
|  | 127 | validation signal (LED 25 lights up) |
| FIG. 3 | 130 | initiation of Po |
|  | 131 | despatch of a command in P2 |
|  | 132 | command executed? (P2 ≦ P0) |
|  | 133 | error signal (LED extinguishes) |
|  | 134 | all commands executed |
|  | 135 | next command |
|  | 136 | validation signal (LED lights up) |
| P0 = group 3 | | |
| P1 = group 4 | | |
| P2 = group 5 | | |
| FIG. 4 | 141 | despatch of a command on P0 |
|  | 142 | command executed? (P1 = P0) |

-continued

Texts in the blocks of the FIGS.

|  | block number | description of the function |
|---|---|---|
|  | 143 | error signal (LED extinguishes) |
|  | 144 | all commands executed |
|  | 145 | other command |
|  | 146 | validation signal (LED lights up) |
| FIG. 5 | 150 | connect boards 47 and 1 |
|  | 151 | all LEDs extinguish |
|  | 152 | all displays set to 0 |
|  | 153 | CPT = 0 |
|  | 154 | TK |
|  | 155 | commands of the displays by means of a table given by CPT |
|  | 156 | CPT : 10 |
|  | 157 | CPT = CPT + 1 |
|  | 158 | validation signal (LED lights up) |
| FIG. 6 | 160 | extinguishing of displays |
|  | 161 | lighting up of lamps 51, 52, 53 |
|  | 162 | MSQ ← 0 |
|  | 163 | CR ← 0 |
|  | 164 | TK |
|  | 165 | CR : : 10 |
|  | 166 | by means of a table given by the counter, selection of the LED to be lit or extinguished in accordance with the value of the mask (using an EXCLUSIVE-OR gate) |
|  | 167 | CR ← CR + 1 |
|  | 168 | MSQ : : FF |
|  | 681 | validation signal (LED lights up) |
|  | 169 | FF → MSQ |
| FIG. 7a | 170 | extinguishing of lamp |
|  | 171 | TK |
|  | 172 | initiation of position counter |
|  | 173 | initiation of the reference |
|  | 174 | end of test? (counter = max. value) |
|  | 175 | reading of SNAT (P0) |
|  | 176 | (SNAT) = reference |
|  | 177 | waiting period of 10 ms |
|  | 178 | setting of the counter on the digit of the program |
|  | 179 | indication of reference |
|  | 790 | counter increment |
| FIG. 7b | 791 | initiation of position counter |
|  | 792 | initiation of reference |
|  | 793 | end of test? (counter = max. value) |
|  | 794 | reading of SENC (P0) |
|  | 795 | (SENC) = reference |
|  | 796 | setting of counter on the temperature digit |
|  | 797 | indication of reference |
|  | 798 | counter increment |
|  | 799 | waiting period of 10 ms |
| FIG. 7c | 7911 | initiation of position counter |
|  | 7922 | initiation of reference |
|  | 7933 | end of test? (counter = max. value) |
|  | 7944 | reading of SCHA (P0) |
|  | 7955 | (SCHA) = reference |
|  | 7966 | setting of counter on digit of spin-drying |
|  | 7977 | indication of reference |
|  | 7988 | counter increment |
|  | 7999 | waiting period of 10 ms |
| FIG. 8 | 180 | connect the boards 42, 47 and 1 |
|  | 181 | control T, ACP, ECO = 1 |
|  | 182 | wait |
|  | 183 | control 43 to the right realized |
|  | 184 | wait |
|  | 185 | indication (lamp T) |
|  | 831 | control 45 to the right realized |
|  | 841 | wait |
|  | 851 | indication (lamp ACP) |
|  | 832 | control 44 to "economy" realized |
|  | 842 | wait |
|  | 852 | indication (lamp 53) |

-continued

Texts in the blocks of the FIGS.

| block number | description of the function |
| --- | --- |
| 186 | LED 25 lights up |
| 187 | end of program |

What is claimed is:

1. An apparatus comprising a programmed digital signal processor having test procedure means and input and output terminals connected to further parts of the apparatus, including input means and display means, gating means having a plurality of inputs and outputs, means for testing the input and output terminals of the signal processor and the connections to the further parts of the apparatus comprising means connecting assigned input and output terminals of the signal processor to the inputs of the gating means and the outputs of the gating means to other assigned input and output terminals of the signal processor to provide a plurality of test paths, means connecting a further input of the gating means to a further terminal of the signal processor which provides a validation signal for the test procedure, means connecting a given output terminal of the signal processor to a test-result indicator, a test input terminal for supplying an actuation signal to activate the signal processor to generate a test-step sequence and provide signals through the relevant test paths, and wherein the signal processor receives the resultant signals at said other assigned terminals to provide a signal to the test-result indicator via said given output terminal.

2. An apparatus as claimed in claim 1 wherein the state of the test input terminal of the microprocessor is changed by application of a voltage by means of a pushbutton switch comprising a "make" contact.

3. An appliance comprising, first input means for inputting parameters for controlling the appliance, second input means for inputting quantities concerning characteristics of goods or objects to be treated in the appliance, display means, a programmed digital signal processor having test procedure means, input terminals for receiving said parameters, output terminals for supplying data to the display means, and terminals for supplying said parameters to treatment members of the apparatus to be controlled, gating means controlled by a further terminal of the signal processor, means for testing the input and output terminals of the signal processor and the connections between said terminals and the input means and display means including means connecting given ones of the input terminals and output terminals of the signal processor to other input terminals and output terminals of the signal processor via said gating means, and a test-result indicator coupled to a given output terminal of the signal processor that supplies a signal for indicating whether or not a tested terminal or a connection is in order when the test procedure means in the signal processor are activated.

4. In an appliance comprising a programmed digital processor having a stored test procedure program and input and output terminals connected to further parts of the appliance including input means and display means, a method of testing the digital processor input and output terminals and the connections to the further parts of the appliance comprising, providing further connections from given input and output terminals of the digital processor via gating means to other input and output terminals of the digital processor, activating a test sequence by operation of a pushbutton switch which changes the state of a test input terminal of the digital processor, and indicating by means of an indicator device whether or not a tested terminal or connection is in good order.

5. A test method as claimed in claim 4, characterized in that operation of the pushbutton starts an automatic internal test sequence of the inputs and the program of the digital processor.

6. A test method as claimed in claim 5, characterized in that one of the test sequences enables an illumination and extinction sequence of the display means by repeatedly operating the pushbutton.

7. A test method as claimed in claim 6 wherein the display means includes switches and characterized in that one of the test sequences displays the position of said switches on the display means.

8. A test method as claimed in claim 6 wherein the display means includes alarm signal lamps and characterized in that one of the test sequences enables the illumination of the alarm signal lamps by operation of corresponding control members of the appliance related to said signal lamps.

* * * * *

UNITED STATES PATENT AND TRADEMARK OFFICE
CERTIFICATE OF CORRECTION

PATENT NO. : 4,455,653
DATED : JUNE 19, 1984
INVENTOR(S) : JACQUES LE GARS ET AL

It is certified that error appears in the above-identified patent and that said Letters Patent is hereby corrected as shown below:

In the Claims:

Claim 7, line 1, change "6" to --5--

Claim 8, line 1, change "6" to --5--

Signed and Sealed this

Ninth Day of September 1986

[SEAL]

Attest:

DONALD J. QUIGG

Attesting Officer

Commissioner of Patents and Trademarks